Sept. 2, 1924.

C. G. WOOD

CLUTCH CLAMPING PLATE

Filed Oct. 21, 1922

INVENTOR.
Clarence G. Wood
BY
ATTORNEY.

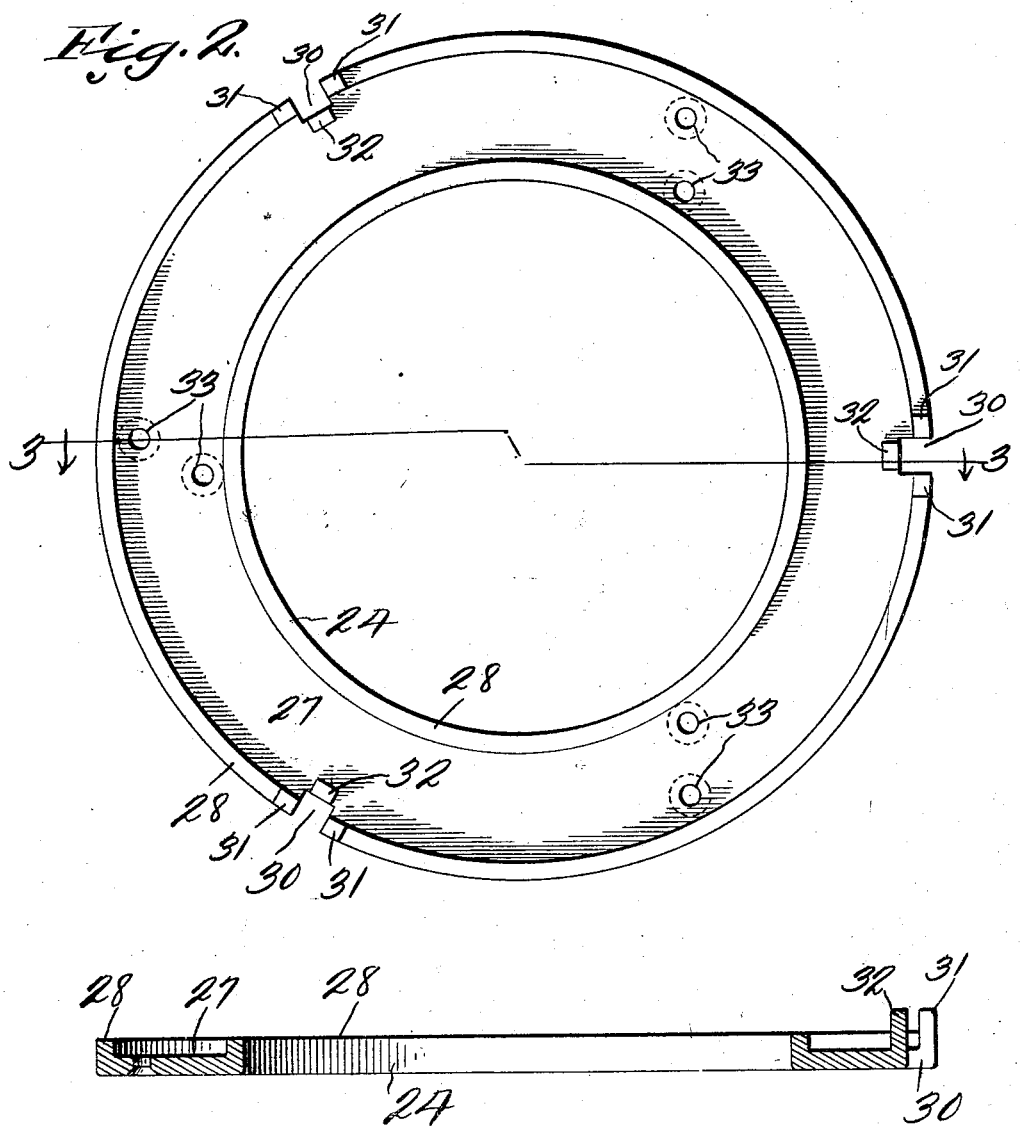

Patented Sept. 2, 1924.

1,506,875

UNITED STATES PATENT OFFICE.

CLARENCE G. WOOD, OF MUNCIE, INDIANA.

CLUTCH CLAMPING PLATE.

Application filed October 21, 1922. Serial No. 596,079.

*To all whom it may concern:*

Be it known that I, CLARENCE G. WOOD, a citizen of the United States, residing at Muncie, in the county of Delaware and State of Indiana, have invented certain new and useful Improvements in Clutch Clamping Plates, of which the following is a specification.

The invention relates to clutch clamping plates used in connection with disc clutches and has for its object to provide a clamping plate which is stamped from a single piece of metal, and is provided with annular stiffening flanges and spaced lugs formed during the stamping operation. The spaced lugs form recesses for the reception of guide lugs carried by the casing of the clutch. By forming the clamping plate from a stamping, the same may be stamped substantially to dimensions and machine work is reduced to a minimum. Where clamping plates are cast, which is now the practice they have to be machined to dimensions, which is an expensive operation, involving high class skilled labor, therefore by stamping the clamping plate it is obvious that the plate can be made substantially correct in a single operation and at a minimum cost, thereby allowing material reduction in cost.

With the above and other objects in view the invention resides in the combination and arrangement of parts as hereinafter set forth, shown in the drawings, described and claimed, it being understood that changes in the precise embodiment of the invention may be made within the scope of what is claimed without departing from the spirit of the invention.

In the drawings:—

Figure 2 is a view in elevation of the clamping plate.

Figure 3 is a horizontal sectional view through the clamping plate taken on line 3—3 of Figure 2.

Figure 1:
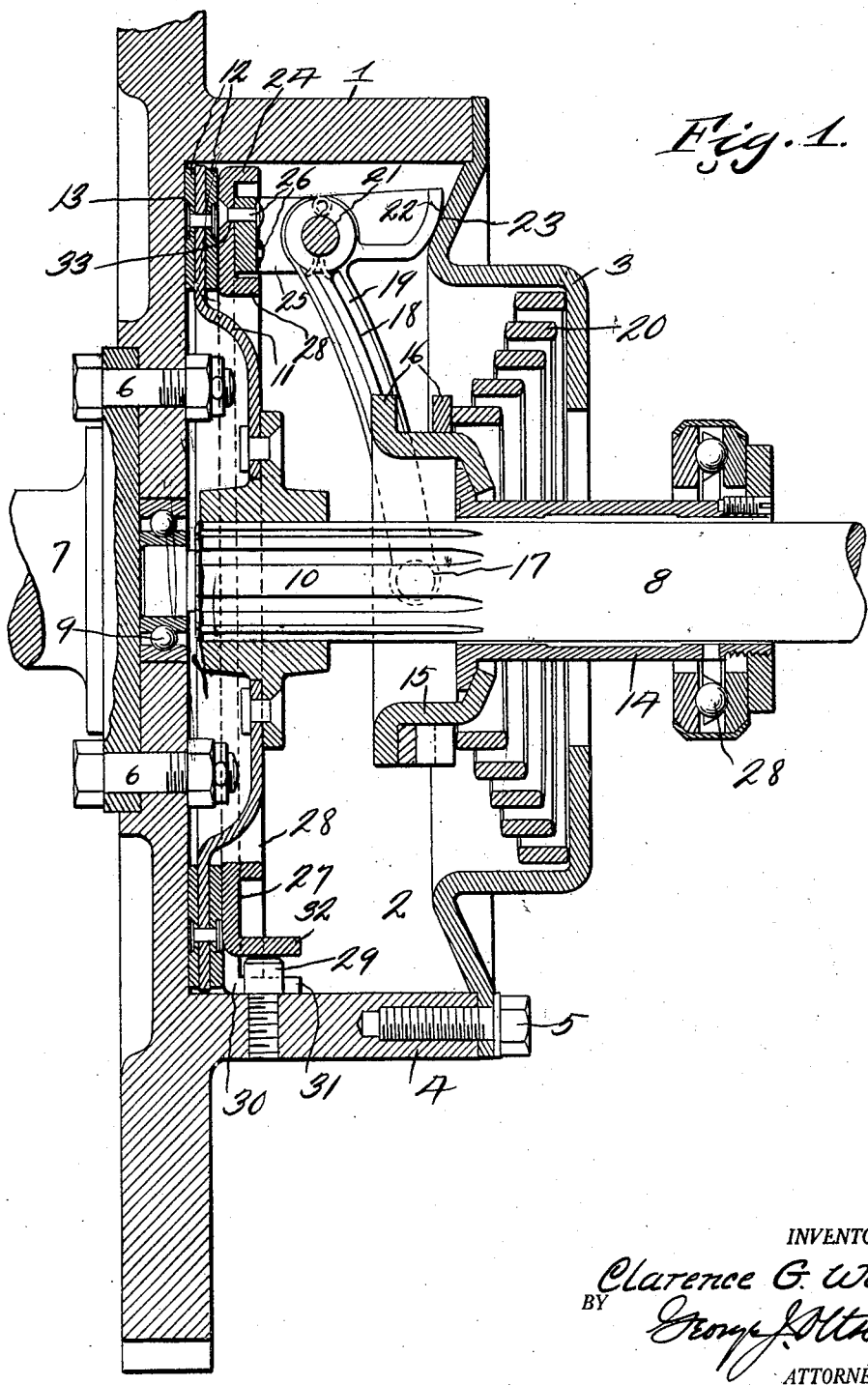
Figure 1 is a vertical longitudinal sectional view through a disc clutch showing the clamping plate applied thereto.

Referring to the drawing, the numeral 1 designates a clutch casing and 2 the chamber therein, which chamber is closed by means of a cover 3. The cover 3 is secured to the flange 4 of the casing 1 by means of bolts 5. Secured to the casing 1 by means of bolts 6 is a drive shaft 7, which may lead to any suitable source of power. Extending axially into the chamber 2 of the casing 1 is a driven shaft 8, the inner end of which is mounted in an antifrictional bearing 9; shafts 7 and 8 being in axial alignment. Secured to the inner end 10 of the driven shaft 8 is a drive disc 11, which disc is provided with friction mats 12, the inner one of which is adapted to be forced into frictional and binding engagement with the inner wall 13 of the chamber 2 of the casing 1 during a clutch operation. Slidably mounted on the driven shaft 8 is a clamping lever sleeve 14, the inner end of which is provided with a collar 15, between the flanges 16 of which, the clamping lever lugs 17 are received, said lugs being carried by the ends of the arms 18 of the clamping levers 19. Interposed between the outer flange 16 of the clamping lever collar 15 and the inner wall of the cover 3 is a coiled spring 20, which normally forces the collar 15 inwardly and rocks the levers 19 on their pivotal points 21 in such a manner that their noses 22 which engage the bevelled surface 23 of the cover 3 force the clamping plate 24 inwardly against the adjacent friction mat 12, and consequently causes a clutching action on the driven plate 11. The levers 19 are pivoted to angle brackets 25 which are riveted or otherwise secured at 26 in the channel 27 of the clamping plate 24. During the clutching and declutching operation the sleeve is controlled by a lever cooperating with the thrust bearing 28 carried thereby.

The clamping plate 24 is stamped from a single sheet of metal thereby obviating machining or casting the plate. However the clamping plate is provided with marginal annular flanges 28, which reinforce the plate and lend stiffness thereto. The clamping plate 24 is guided in its inward and outward movement by means of guide lugs 29 which extend into the chamber 2 and are received in spaced recesses 30 in the margin of the plate and extend transversely of the plate. Heretofore it has been necessary, where plates are cast, to machine the plates or grind the same to dimensions, after which the recesses 30 are cut. These operations are expensive ones, and to obviate machining recesses 30, recesses are formed during a stamping operation by forming spaced lugs 31 on the outer flange 28 and lugs 32 adjacent the lower ends of the recesses, therefore it will be seen that machine work is obviated, and the recesses are formed during the stamping operation when the plate 24 is made. The apertures 33 are formed by drilling the same after the plates have been stamped.

From the above it will be seen that a clutch clamping plate is provided, which is simple in construction and formed from a single stamping, thereby obviating the present practice of machining clamping plates and obviating the high cost of production.

The invention having been set forth what is claimed as new and useful is:—

The combination with a disc clutch, of a clamping plate carried by said clutch, lugs engaging recesses in the outer edges of the plate for guiding said plate in its movement, said clamping plate having integral annular flanges at its inner and outer edges, said recesses extending through the outer flange of the plate, guide lugs extending outwardly from the outer flange adjacent the recess sides, and guide lugs extending outwardly from the body of the plate adjacent the inner ends of the recesses, said clamping plate and guide lugs being stamped from a single piece of material.

In testimony whereof I affix my signature.

CLARENCE G. WOOD.